United States Patent
Hong et al.

(10) Patent No.: US 8,520,619 B2
(45) Date of Patent: Aug. 27, 2013

(54) METHOD OF TRANSMITTING AND RECEIVING CONTROL INFORMATION BASED ON SPATIAL-MULTIPLEXING GAIN

(75) Inventors: Young Jun Hong, Seoul (KR); Bruno Clerckx, Seoul (KR); Young Ho Jung, Goyang-si (KR); Joon Young Cho, Suwon-si (KR); Jin Kyu Han, Seoul (KR); In Ho Lee, Suwon-si (KR); Hyoung Ju Ji, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 257 days.

(21) Appl. No.: 12/983,702

(22) Filed: Jan. 3, 2011

(65) Prior Publication Data
US 2011/0249633 A1   Oct. 13, 2011

(30) Foreign Application Priority Data
Apr. 7, 2010   (KR) .................. 10-2010-0032073

(51) Int. Cl.
*H04W 4/00*   (2009.01)
(52) U.S. Cl.
USPC ........................................ 370/329
(58) Field of Classification Search
USPC ......... 370/203, 204–215, 229–240, 310–337, 370/338–350, 351–394, 395.1, 395.3, 395.4, 370/395.41, 395.42, 395.5, 395.52, 395.53, 370/412–421, 431–457, 458–463, 464–497, 370/498–529
See application file for complete search history.

(56) References Cited

U.S. PATENT DOCUMENTS

| | | | |
|---|---|---|---|
| 7,283,016 B2 | 10/2007 | Haruta et al. | |
| 7,554,419 B2 | 6/2009 | Inoue et al. | |
| 2008/0287155 A1 | 11/2008 | Xu et al. | |
| 2009/0154607 A1 | 6/2009 | Lindoff et al. | |
| 2009/0209247 A1 | 8/2009 | Lee et al. | |
| 2010/0165847 A1* | 7/2010 | Kamuf et al. | 370/241 |
| 2011/0064159 A1* | 3/2011 | Ko et al. | 375/267 |
| 2011/0110296 A1* | 5/2011 | Malladi et al. | 370/328 |
| 2012/0076078 A1* | 3/2012 | Han et al. | 370/328 |

FOREIGN PATENT DOCUMENTS

| | | |
|---|---|---|
| EP | 2124368 A1 | 11/2009 |
| JP | 2006-074749 | 3/2006 |
| JP | 2009-272666 | 11/2009 |
| KR | 10-2003-0087729 | 11/2003 |
| KR | 10-2007-0017926 | 2/2007 |

OTHER PUBLICATIONS

International Search Report issued Nov. 7, 2011, in counterpart International Application No. PCT/KR2011/001111 (4 pages, in English).

* cited by examiner

*Primary Examiner* — Jung-Jen Liu
(74) *Attorney, Agent, or Firm* — NSIP Law

(57) ABSTRACT

A control information transmission and reception method based on a spatial-multiplexing gain, are provided. The control information may be transmitted by obtaining the spatial-multiplexing gain using an E-PDCCH region, and thus, a transmission efficiency of the control information may be improved. The common control information used for decoding the E-PDCCH may be transmitted via a PDCCH, and thus, a base station supporting both a general terminal and an enhanced terminal may effectively transmit the control information. Information associated with an indicator indicating whether the E-PDCCH is to be used during a subsequent resource allocation period may be transmitted, and thus, whether decoding with respect to the E-PDCCH is to be performed during the subsequent allocation period may be determined.

19 Claims, 12 Drawing Sheets

METHOD OF TRANSMITTING AND RECEIVING CONTROL INFORMATION BASED ON SPATIAL-MULTIPLEXING GAIN

CROSS-REFERENCE TO RELATED APPLICATION(S)

This application claims the benefit under 35 U.S.C. §119(a) of Korean Patent Application No. 10-2010-0032073, filed on Apr. 7, 2010, in the Korean Intellectual Property Office, the entire disclosure of which is incorporated herein by reference for all purposes.

BACKGROUND

1. Field

The following description relates to a method of transmitting control information by a base station, and more particularly, to a method of a base station simultaneously supporting two types of terminals, and a reception method of receiving the control information.

2. Description of Related Art

To simultaneously support a terminal in a general communication system and a terminal in an enhanced communication system, a control channel may be configured to enable the terminal in the enhanced system to obtain information associated with a broadcast channel allocated to a corresponding terminal. In addition, the terminal may obtain resource information for the control channel and information used for decoding.

SUMMARY

In one general aspect, there is provided a transmission method, comprising allocating resource blocks (RBs) to at least one data stream transmitted via an enhanced-physical downlink shared channel (E-PDSCH), generating control information for each of the RBs, allocating the control information for each of the RBs to a resource region for an enhanced-physical downlink control channel (E-PDCCH), and performing one of beamforming of the control information for each of the RBs based on the resource region, spatial-multiplexing of the control information associated with the RBs based on the resource region, and beamforming-based spatial-multiplexing of the control information associated with the RBs based on the resource region.

The transmission method may further comprise generating an indicator indicating whether the E-PDCCH is used in a subsequent resource allocation period, wherein the control information includes the indicator.

The allocating of the control information may comprise allocating the control information to enable the resource region used for transmitting the control information to be a portion of a physical resource used by the E-PDSCH.

The transmission method may further comprise generating common control information used for decoding the control information for each of the RBs, and transmitting the common control information via a physical downlink control channel (PDCCH).

The generating may comprise generating at least one of information associated with a range of the resource region to which the control information for each of the RBs is allocated, information associated with a range of the RBs to which the at least one data stream is allocated, a group terminal identifier for a terminal where decoding of E-PDCCH is to be performed, information associated with a location and a pilot pattern for demodulation, information associated with a power offset, and information associated with a transport format.

The allocating of the RBs may comprise allocating a portion of all the RBs for the at least one data stream to the at least one data stream, the allocating of the control information may comprise allocating the control information using a portion of an entire resource region for the E-PDCCH, and the generating of the common control information may comprise generating the control information including the information associated with the portion of all the RBs and information associated with the portion of the entire resource region.

The transmission method may further comprise allocating the common control information to a predetermined resource region for the PDCCH, wherein both a type 1 terminal and a type 2 terminal successfully decode the information received via the PHCCH, and the type 2 terminal is supported by a different type of system than the type 1 terminal.

The type 1 terminal may be supported by an enhanced system and the type 2 terminal may be supported by a general system.

The transmission method may further comprise generating common control information used for decoding the control information for each of the RBs, and transmitting the common control information via a predetermined broadcast channel.

The generating may comprise generating at least one of information associated with a range of the resource region to which the control information for each of the RBs is allocated, information associated with a range of the RBs to which the at least one data stream is allocated, a group terminal identifier for a terminal where decoding of E-PDCCH is to be performed, information associated with a location and a pilot pattern for demodulation, information associated with a power offset, and information associated with a transport format.

The allocating of the RBs may comprise allocating a portion of all the RBs for the at least one data stream to the at least one data stream, the allocating of the control information may comprise allocating the control information using a portion of an entire resource region for the E-PDCCH, and the generating of the common control information may comprise generating the control information including the information associated with the portion of all the RBs and information associated with the portion of the entire resource region.

The generating of the control information may generate at least one of information associated with a range of the RBs to which the at least one data stream is allocated, information associated with a number of the at least one data stream, a terminal identifier of a terminal to which control information is allocated, location information and a pilot pattern for demodulation, information associated with a power offset, information associated with a co-scheduled terminal, H-ARQ information, and information associated with a modulation and coding scheme.

The allocating of the control information may comprises allocating the control information to enable the resource region for the E-PDCCH to overlap a region of the RBs to which the at least one data stream is allocated.

When a type 1 terminal and a type 2 terminal exist, the type 1 terminal may succeed in decoding information received via the E-PDCCH and the type 2 terminal may not decode or may fail in decoding the information received via the E-PDCCH, and the type 2 terminal may be supported by a different type of system than the type 1 terminal.

The type 1 terminal may be supported by an enhanced system and the type 2 terminal may be supported by a general system.

In another aspect, there is provided a reception method, comprising extracting a previous indicator included in multiple pieces of control information received in a previous resource allocation period, determining, using the previous indicator, a channel through which multiple pieces of target control information are transmitted, from among an E-PDCCH and a PDCCH, and decoding the multiple pieces of target control information based on the determination.

When the determination determines that the multiple pieces of target control information are transmitted through the PDCCH, the decoding may comprise decoding the multiple pieces of target control information based on a radio resource for the PDCCH.

When the determination determines that the multiple pieces of target control information are transmitted through the E-PDCCH, the method may further comprise receiving common control information of the multiple pieces of target control information via one of the PDCCH and a predetermined channel, and the decoding may comprise decoding the multiple pieces of target control information based on the common control information.

The decoding may comprise decoding the common control information based on a group terminal identifier that is commonly allocated to all terminals in an enhanced system.

When each of the multiple pieces of target control information corresponds to a respective data stream and the determination determines that the multiple pieces of target control information are transmitted via the E-PDCCH, the decoding may comprise decoding each of the multiple pieces of target control information based on a signal to noise ratio (SNR) of corresponding target control information.

The decoding may comprise determining a decoding sequence for the multiple pieces of target control information based on an SNR of each target control information, and continuously decoding the multiple pieces of target control information until a desired number of target control information is successfully decoded.

The method may further comprise decoding, based on the multiple pieces of decoded target control information, at least one data stream received from the E-PDSCH or a physical downlink shared channel (PDSCH).

When the determination determines that the multiple pieces of target control information are transmitted via the E-PDCCH, the multiple pieces of target control information may include information associated with RBs allocated to at least one data stream, and the at least one data stream may be transmitted via the E-PDSCH.

When the multiple pieces of target control information are allocated to the same resource region, the resource region is for the E-PDCCH, and the multiple pieces of target control information may be one of spatial-multiplexed, beamforming-processed, and a beamforming-based spatial-multiplexed based on the same resource region.

When a type 1 terminal and a type 2 terminal exist, the type 1 terminal may succeed in decoding information received via the E-PDCCH and the type 2 terminal may not decode or may fail in decoding the information received via the E-PDCCH, and the type 2 terminal may be supported by a different type of system than the type 1 terminal.

The type 1 terminal may be supported by an enhanced system and the type 2 terminal may be supported by a general system.

In another aspect, there is provided a reception method, comprising receiving control information that is one of beamforming-processed, spatial-multiplexed, and beamforming-based spatial-multiplexed, via an E-PDCCH, decoding the control information based on a blind decoding scheme, recognizing, based on the decoded control information, RBs allocated to least one data stream that is transmitted via the E-PDSCH, and receiving at least one data stream based on the RBs allocated to the at least one data stream.

When a type 1 terminal and a type 2 terminal exist, the type 1 terminal may succeed in decoding information received via the E-PDCCH and the type 2 terminal may not decode or may fail in decoding the information received via the E-PDCCH, and the type 2 terminal may be supported by a different type of system than the type 1 terminal.

The type 1 terminal may be supported by an enhanced system and the type 2 terminal may be supported by a general system.

In another aspect, there is provided a transmitter, comprising a scheduler to allocate RBs to at least one data stream transmitted via an E-PDSCH, to generate control information for each of the RBs, and to allocate the control information for each of the RBs to a resource region for an E-PDCCH, and a spatial-multiplexer to perform one of beamforming, spatial-multiplexing, and beamforming-based spatial-multiplexing with respect to each of the RBs, based on the resource region.

In another aspect, there is provided a receiver, comprising a memory to store a previous indicator included in control information received in a previous resource allocation period, and a processor to determine, based on the previous indicator, a channel through which target control information is transmitted, from among an E-PDCCH or a PDCCH, and to decode the target control information based on the determination.

Other features and aspects may be apparent from the following description, the drawings, and the claims.

BRIEF DESCRIPTION OF THE DRAWINGS

Throughout the drawings and the description, unless otherwise described, the same drawing reference numerals should be understood to refer to the same elements, features, and structures. The relative size and depiction of these elements may be exaggerated for clarity, illustration, and convenience.

DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein may be suggested to those of ordinary skill in the art. Also, descriptions of well-known functions and constructions may be omitted for increased clarity and conciseness.

As described herein, a base station may support a terminal based on an enhanced communication standard while continuously supporting a terminal in a general communication system. The base station may effectively transmit control information and the enhanced terminal may effectively receive the control information. The examples described herein may be applicable to a terminal and a base station in an enhanced system, for example, a 3rd Generation Partnership Project Long Term Evolution advanced system (LTE Advanced). The advanced system is more enhanced than the general system such as a 3GPP Long Term Evolution (3GPP LTE) general system. Although the examples described herein are based on an enhanced terminal of a 3GPP LTE advanced system (LTE Advanced) while continuously supporting a terminal of the 3GPP LTE system, it should be understood that this is merely for purposes of example. Accordingly, the technology described herein is not limited to the LTE Advanced system, and other advanced systems may be applicable.

A data stream may be one-to-one mapped to a layer corresponding to the data stream and thus, both terms may be used together throughout the examples described herein.

Figure 1:
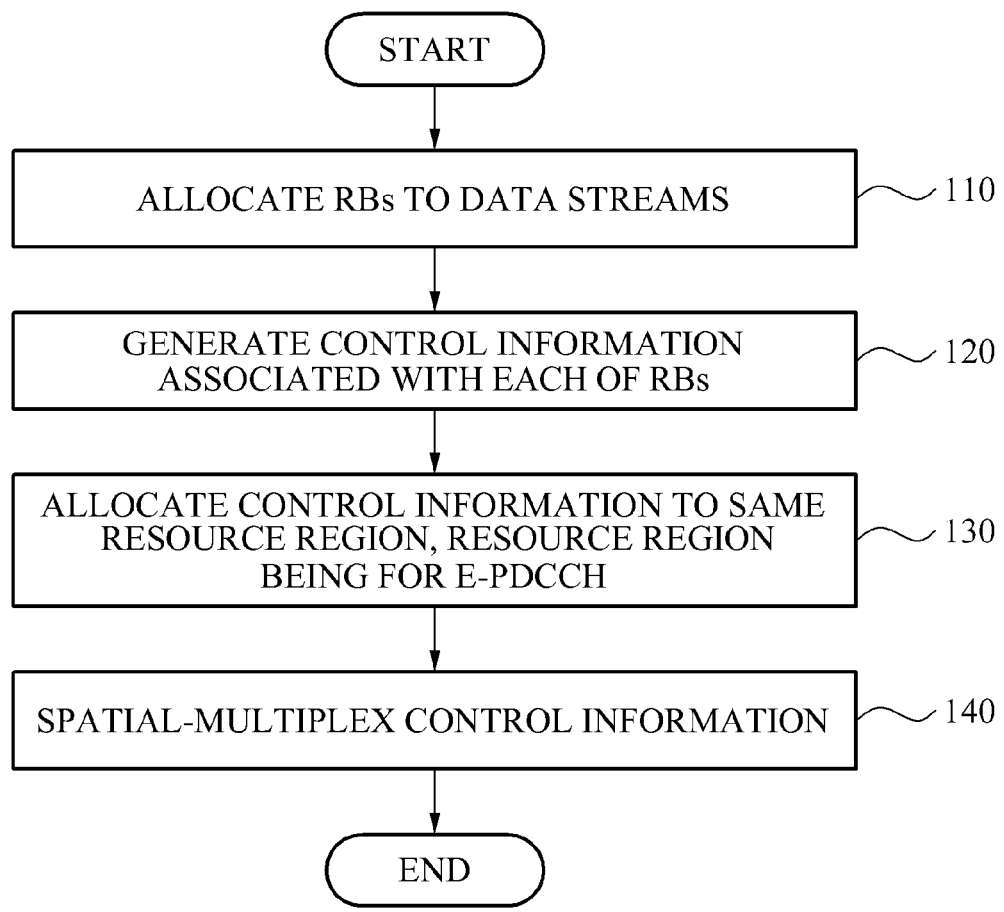
FIG. 1 is a flowchart illustrating an example of a method of transmitting control information based on a spatial-multiplexing gain.

FIG. 1 illustrates an example of a method of transmitting control information based on a spatial-multiplexing gain.

Referring to FIG. 1, a base station may transmit control information for an enhanced terminal based on a transmission method. In this example, an enhanced terminal may be referred to as a type 1 terminal that is supported by a LTE Advanced system and a general terminal may be referred to as a type 2 terminal that is supported by a 3GPP LTE system.

The base station may allocate resource blocks (RBs) to at least one data stream transmitted via an enhanced-physical downlink shared channel (E-PDSCH), in 110. For example, the base station may allocate only some of the RBs out of all the RBs to the at least one data stream. In an example where the number of available RBs to be allocated for data streams is limited, the base station may reduce an amount of control information.

The base station generates control information, such as downlink control information (DCI) for the E-PDSCH, for each of the RBs, in 120.

In 130, the base station allocates the control information for each of the RBs to the same resource region such as an enhanced-physical downlink control channel (E-PDCCH). As an example, the enhanced terminal may succeed in decoding information received via the E-PDCCH, and the general terminal may fail to decode the information received via the E-PDCCH. As another example, the enhanced terminal and the general terminal may both succeed in decoding information received via a physical downlink control channel (PDCCH). For example, a demodulation reference signal (DM-RS) may be a dedicated pilot. Accordingly, a terminal that may receive the DM-RS may be the enhanced-terminal and a terminal that may not receive the DM-RS may be the general terminal.

As an example, the control information may be allocated using only a portion of the entire resource region for the E-PDCCH. A resource region where control information is allocated is limited and thus, an amount of common control information may be reduced.

For example, the control information may be allocated to the resource region for the E-PDCCH to enable the resource region used for transmitting the control information to be a portion of a physical resource used by the E-PDSCH, instead of allocating the entire resource region for the E-PDCCH.

The base station performs spatial-multiplexing on the control information for each of the RBs based on the same resource region, in 140. For example, the E-PDCCH of the same physical resource may be spatially multiplexed through a beamforming process. Thus, the transmission efficiency of control information transmitted to a single terminal or to a plurality of terminals may be improved.

Although it is not illustrated in FIG. 1, the base station may perform beamforming of the control information for each of the RBs or may perform spatial-multiplexing of the control information for each of the RBs, based on the same resource region.

Multiple pieces of control information, for example, multiple pieces of DCI for the E-PDSCH, may share the same frequency resource and the same time resource for the E-PDCCH. Accordingly, multiple pieces of control information may be transmitted after being one of spatial-multiplexed, beamforming-processed, and beamforming-based spatial-multiplexed.

In this example, a plurality of control information streams that may be one of spatial-multiplexed, beamforming performed, and beamforming-based spatial-multiplexed may be transmitted to different terminals or to a single terminal. As another example, a single control information stream may be transmitted to a single terminal that may obtain a beamforming gain through the beamforming process. The control information streams of the enhanced system may have the same control channel element (CCE). For example, the DCI for the E-PDSCH may be one of beamforming-performed, spatial-multiplexed based on the same time resource and the same frequency resource, and beamforming-based spatial-multiplexed based on the same time resource and the same frequency resource, and may have the same CCE.

Content of Control Information

Control information, for example, the DCI for the E-PDSCH, may include information as given below, in order to support a multiple user-multiple input multiple output (MU-MIMO) transmission in the E-PDSCH.

a terminal identifier of a terminal where DCI for the E-PDSCH is allocated, for example, the terminal identifier may be a cell Radio Network Temporary Identifier (C-RNTI), and the C-RNTI may be scrambled to a cyclic redundancy check (CRC);

a bitmap of RBs used for transmitting the E-PDSCH or frequency resource information used for transmitting the E-PDSCH, for example, a range of RBs where at least one data stream transmitted via the E-PDSCH is allocated;

a number of symbols and a location of an orthogonal frequency division multiplexing (OFDM) used for transmitting the E-PDSCH or time resource information used for transmitting the E-PDSCH, for example, a range of RBs where at least one data stream transmitted via E-PDSCH is allocated;

information associated with a location and a pilot pattern, such as a reference signal (RS) pattern, to be used for demodulation;

power offset;

a number of layers of the E-PDSCH, for example, a number of at least one data stream transmitted via the E-PDSCH, and information associated with the allocated layer;

information associated with a co-scheduled terminal;

other information used for decoding the E-PDSCH;

information associated with an indicator, such as 1 Bit Indicator, indicating a channel to be used for transmitting resource allocation information from among a PDCCH and the E-PDCCH, during a subsequent allocation period; and the like.

Examples of the other information for decoding the E-PDCCH may include, for example, hybrid automatic repeat request (H-ARQ) information, such as a H-ARQ process ID, a new data indicator, a redundancy version, and the like, and may include information associated with a transport format, such as modulation and coding schemes.

When the indicator is transmitted, effects that may improve a transmission efficiency of a control channel may be provided.

For example, the base station may select a control channel having a relatively high transmission efficiency from among the PDCCH and the E-PDCCH to perform transmission, and thus, the efficiency of a control channel may increase. Based on a channel environment of each terminal, a number of terminals, a type of control information to be transmitted, and the like, the transmission using the PDCCH may be may be more effective in comparison to the transmission using the E-PDCCH. Terminals to be scheduled may be different for each frame, and thus, the efficiency may vary. Therefore, when the indicator is used, the base station may freely select a control channel to be used for transmission in order to minimize an overhead of entire control channels, and thus, a transmission efficiency of the entire control channels may be improved.

The information associated with the indicator may be used to decrease the decoding complexity of a terminal, and a further description thereof is provided herein.

Common Control Information

When a control channel of an enhanced-system is supported and a control channel of a general system is also supported, a base station may effectively transmit, to a terminal, information used for decoding the enhanced control channel, for example, resource information for the enhanced control channel, a modulation scheme, a channel coding scheme, and the like.

For example, the base station may transmit, to each terminal via the PDCCH, common control information, for example, DCI for the E-PDCCH, used for decoding control information transmitted via E-PDCCH. An enhanced terminal may decode the PDCCH to obtain the common control information, and may decode the E-PDCCH based on the common control information. As an example, the E-PDCCH may be located in a region of the PDSCH based on a structure of a frame of a general system, such as a 3GPP LTE system. When the E-PDCCH is decoded, control information, such as resource allocation information for each terminal and the like, may be obtained.

For example, the common control information used for decoding the E-PDCCH that corresponds to each of enhanced terminals in a LTE Advanced system may not received by each terminal and may be commonly received by enhanced terminals only that may decode the E-PDCCH. For example, the common control information may include a location of a resource of the entire E-PDCCH, a number of resources allocated for transmitting the E-PDCCH, a number of spatial-multiplexed layers, and the like. The information may be transmitted based on a group terminal identifier, such as a group C-RNTI, which is commonly shared by all the enhanced terminals. The group terminal identifier used for the described purpose, for example, a FFF4-FFFC: that is reserved for future use, may be predetermined in a system, or the base station may report the group terminal identifier to a corresponding terminal via a separate broadcast channel. Accordingly, the enhanced terminal may obtain information associated with a corresponding group C-RNTI before decoding the E-PDCCH.

The common information, for example, DCI for the E-PDCCH, may include information used for decoding the E-PDCCH as given below.

a group terminal identifier, such as a Group C-RNTI, for example, the group terminal identifier may be scrambled to a CRC;

a bitmap of RBs used for transmitting E-PDCCH and E-PDSCH or frequency resource information used for transmitting the E-PDCCH and the E-PDSCH, for example, a range of a resource region where control information is allocated or a range of RBs where at least one data stream is allocated, the range of the resource region or the range of the RBs includes information associated with a range of a resource region, a range of a limited resource region when RBs are limited, or a range of limited RBs;

a number of OFDM symbols or time resource information used for transmitting the E-PDCCH, for example, a range of a resource region where control information is allocated;

information associated with a location and a pilot pattern, such as a reference signal (RS) pattern, used for demodulation;

power offset;

a number of layers of the E-PDCCH;

other information associated with the E-PDCCH; and the like.

Examples of the other information associated with the E-PDCCH may include, for example, information associated with a transport format, such as a CCE aggregation level.

For example, the Group C-RNTI may be transmitted after being scrambled to the CRC or may be separately transmitted. The general terminal may not be able to decode the common control information because the group C-RNTI included in the common control information, for example, DCI for the E-PDCCH, may be different from a terminal identifier of the corresponding terminal. A terminal used for deciding the E-PDCCH from among the enhanced terminals may be aware of the group C-RNTI information, and thus, may successfully decode the common control information allocated to the corresponding group C-RNTI in the same manner as a scheme of decoding the PDDCH. As an example, the 3GPP LTE system may use a blind decoding scheme.

Figure 6:
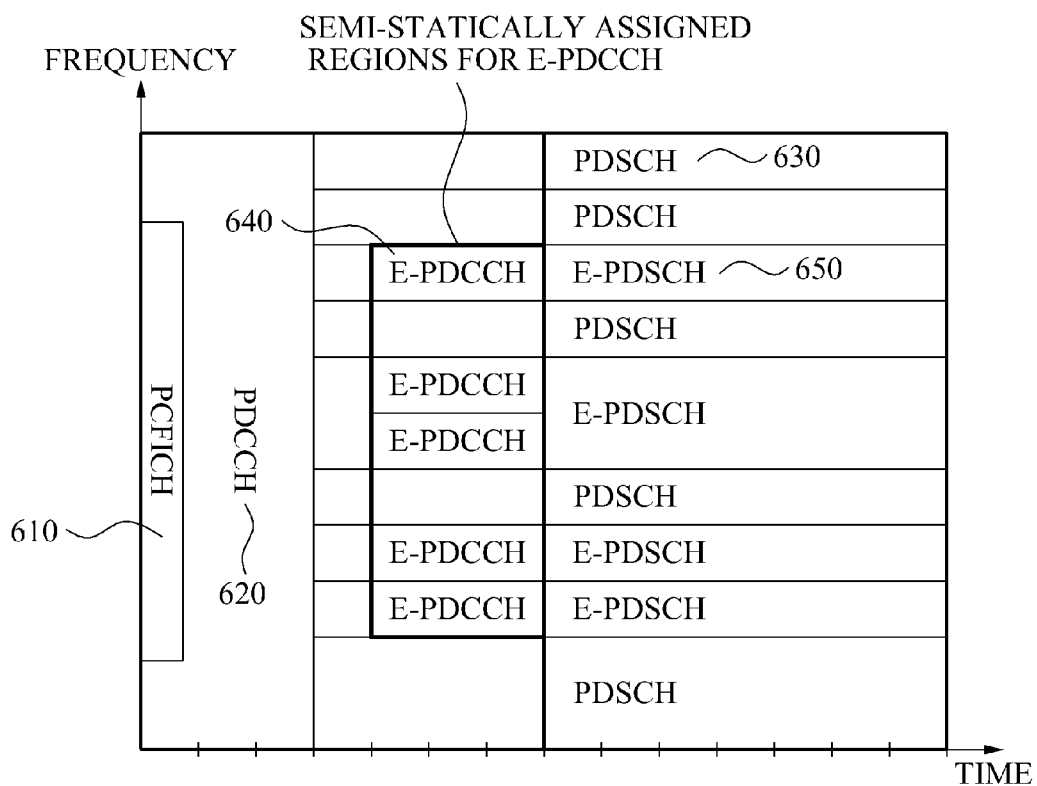
FIG. 6 is a diagram illustrating an example of a semi-static format of a control channel transmission frame to support an enhanced terminal.

When a transmission frame having a semi-static format is used, for example, the format of FIG. 6 is used, the common control information may be transmitted via a predetermined broadcast channel (BCH) or other channels.

Figure 2:
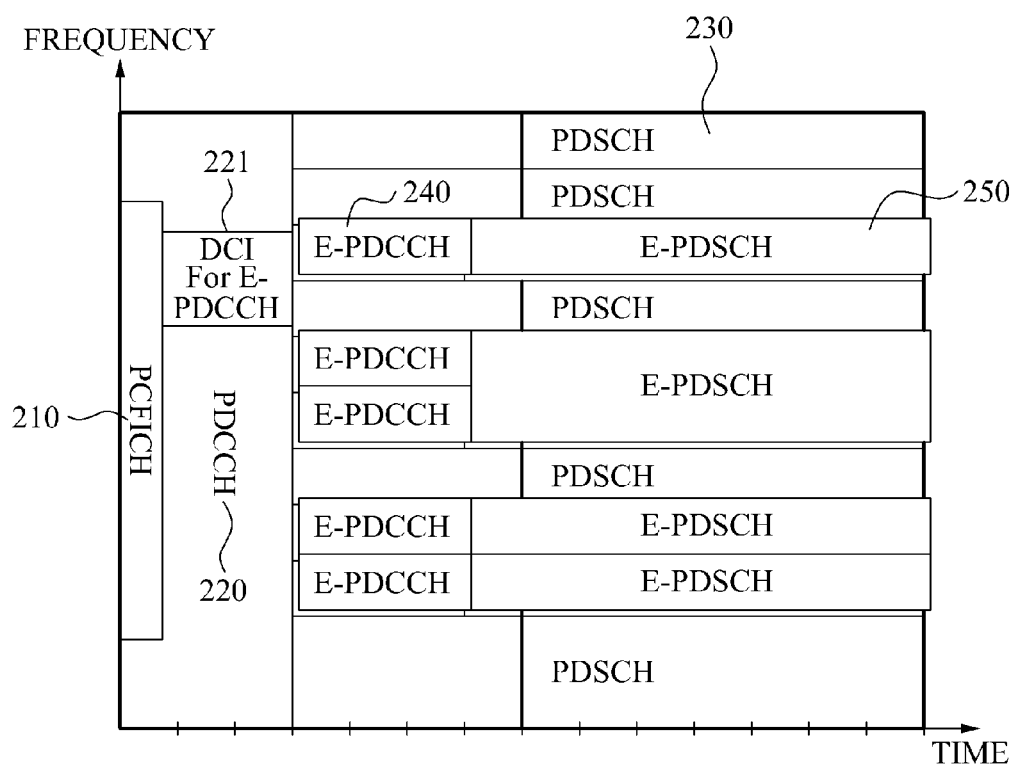
FIG. 2 is a diagram illustrating an example of a dynamic format of a control channel transmission frame to support an enhanced terminal.

FIG. 2 illustrates an example of a dynamic format of a control channel transmission frame to support an enhanced terminal.

Referring to FIG. 2, a base station may simultaneously support a general terminal and an enhanced terminal using a transmission frame having a format of FIG. 2. For example, a Physical Control Format Indicator Channel (PCFICH) 210 and a PDCCH 220 transmitted during three symbol periods may be control channels based on a 3GPP LTE standard. For example, the PCFICH 210 may be a channel used for transmitting information associated with control channel format indicator (CCFI) indicating a location of the PDCCH, and the PDCCH 220 may transmit information associated with a number of transmitted symbols for the PDCCH 220. The PDCCH 220 may transmit, to each terminal, control information, such as resource allocation information associated with a resource transmitted to a corresponding terminal.

For example, a plurality of candidates for a length of a DCI transmitted to each terminal may exist and a plurality of candidates for a size of a physical resource CCE occupied for transmitting the DCI may exist. Information thereof may not be separately transmitted. For example, each terminal may attempt to decode all possible combinations of the plurality of candidates, until succeeding in decoding the DCI. A terminal identifier, for example, a C-RNTI, of the terminal to which the resource is to be allocated may not be included in the DCI and the C-RNTI may be transmitted after being scrambled to the CRC.

The general terminal, such as a 3GPP LTE terminal, may obtain control information by receiving, for example, the PCFICH 210 and the PDCCH 220 transmitted during an initial period of the frame.

The base station may have two schemes to transmit control information to an enhanced terminal, such as an LTE-Advanced terminal.

As a first example, the base station may transmit the control information to the enhanced terminal based on the PCFICH 210 and the PDCCH 220 which are control channels of the general system, such as the 3GPP LTE system. In this example, a new control message to support a new transmission mode of an enhanced system may be additionally used. For example, a logical control message may be additionally used without changing a control channel of a 3GPP LTE standard, and thus, a change in a standard associated with an E-PDCCH, such as a control channel of a LTE Advanced system, may be minimized.

As a second example, the base station may transmit the control information using an E-PDCCH 240. In this example, control information associated with an E-PDSCH 250 where data streams are allocated, may be transmitted based on the E-PDCCH 240. For example, common control information 221 that the enhanced terminal uses for decoding the E-PDCCH 240 may be transmitted using the general control channel such as PDCCH 220. In this example, the base station may perform one of spatial-multiplexing, beamforming, and a beamforming-based spatial-multiplexing of the control information, such as the DCI for the E-PDSCH, transmitted using via E-PDCCH 240, as described above. For example, the general terminal may receive the control information associated with the PDSCH 230, using the PDCCH 220. Accordingly, a transmission efficiency of the control information associated with the enhanced terminal may be improved, a decoding complexity of the E-PDCCH 240 may be minimized, and amount of the common control information 221, such as the DCI for the E-PDSCH, may be reduced.

Figure 3:
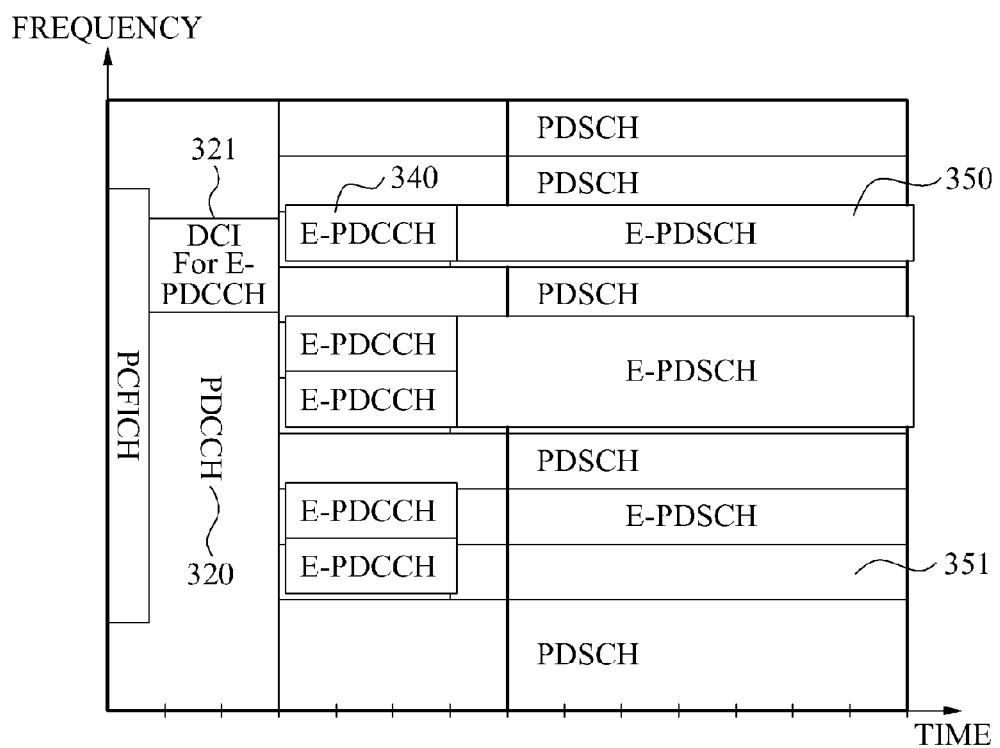
FIG. 3 is a diagram illustrating a second example of a dynamic format of a control channel transmission frame to support an enhanced terminal.

FIG. 3 illustrates a second example of a dynamic format of a control channel transmission frame to support an enhanced terminal.

Referring to FIG. 3, with respect to the E-PDCCH 340 and the E-PDSCH 350 being transmitted based on the same RBs, a number of layers of the E-PDCCH 340 may not always be the same as a number of layers of the E-PDSCH 350, and the E-PDCCH 340 transmitted through a predetermined RBs may not always transmit allocation information associated with the E-PDSCH 350 transmitted through the corresponding RB. For example, the E-PDCCH 340 may allocate control information associated with another E-PDSCH in addition to control information associated with the E-PDSCH 350 that uses the same RBs as the RBs of the E-PDCCH 340.

A portion 351 of RBs for the E-PDSCH 350, for example, the RBs corresponding to the RBs of the E-PDCCH 340, may not be used as illustrated in FIG. 3. For example, the common control information 321 may show a range of the RBs used for transmitting the E-PDCCH 340 and the E-PDSCH 350 using a bitmap. As an example, the range of the RBs used for transmitting the E-PDCCH 340 and the E-PDSCH 350 may be a superset of a range of RBs that may be occupied by the E-PDCCH 340 and the E-PDSCH 350. A spatial-layer of the E-PDCCH 340 and a spatial-layer of the E-PDSCH 350 may be different.

Figure 4:
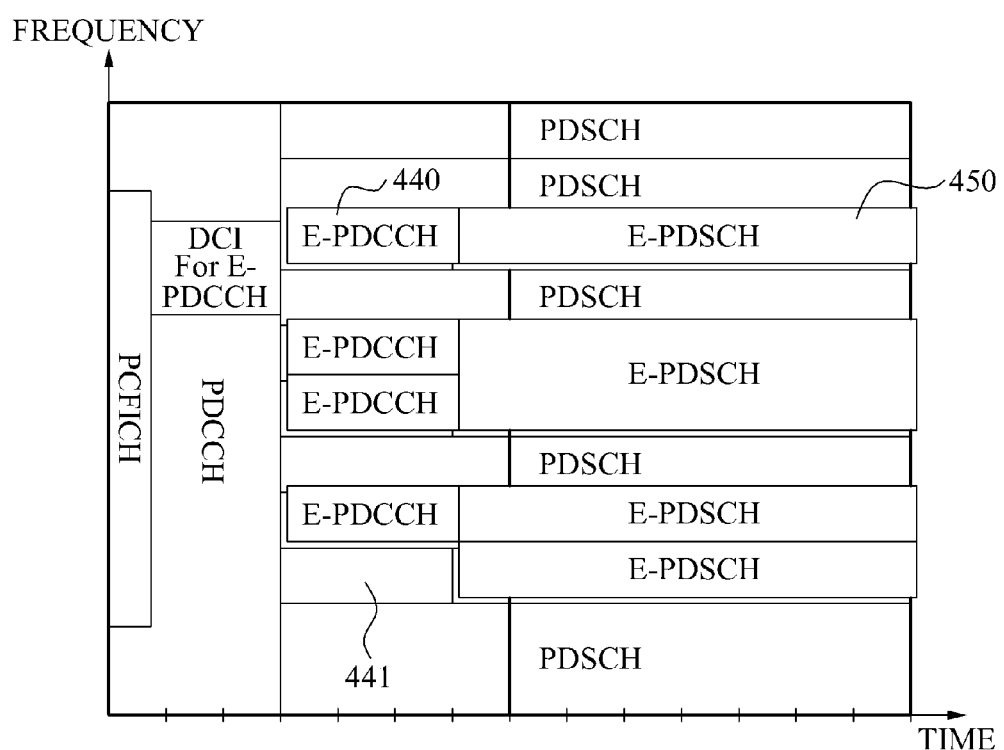
FIG. 4 is a diagram illustrating a third example of a dynamic format of a control channel transmission frame to support an enhanced terminal.

FIG. 4 illustrates a third example of a dynamic format of a control channel transmission frame to support an enhanced terminal.

Referring to FIG. 4, a portion 441 of RBs for an E-PDCCH 440, for example, the RBs corresponding to an RBs of an E-PDSCH 450, may not be used similar to the example shown in FIG. 3.

Figure 5:
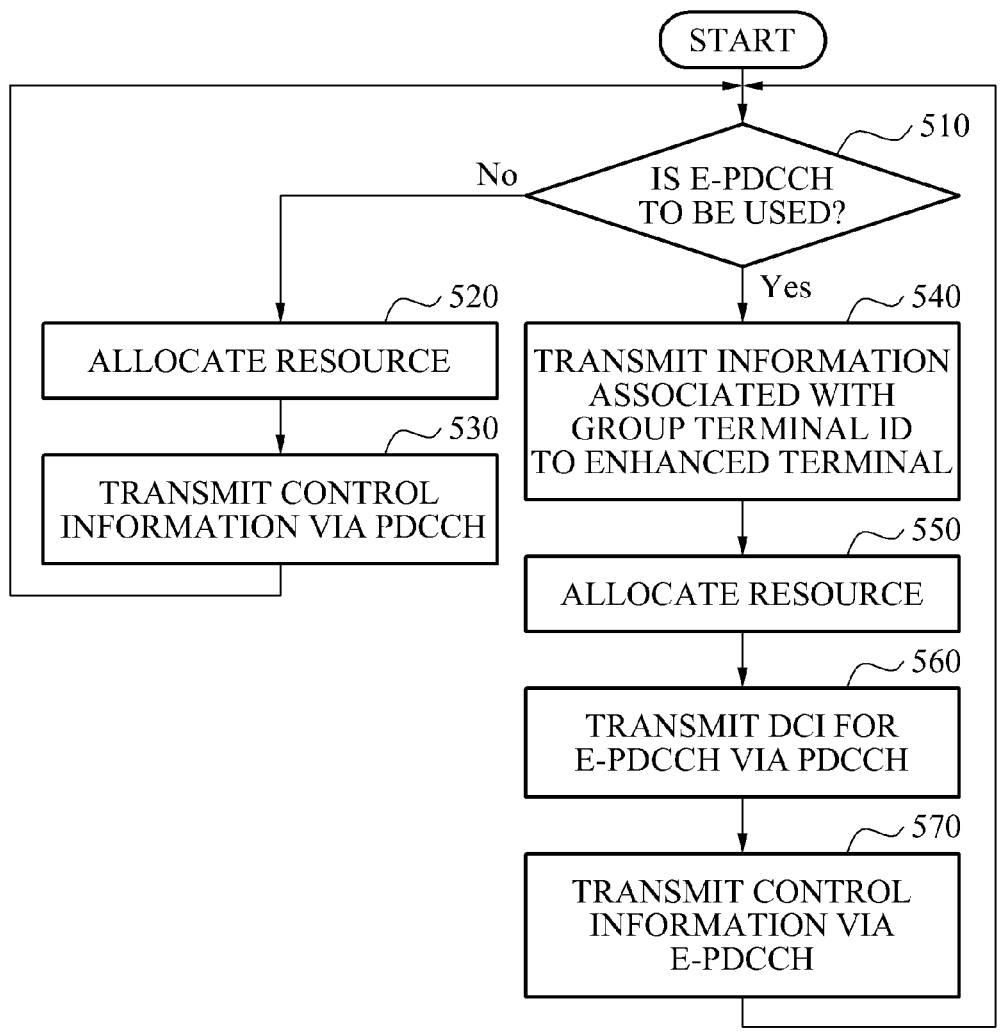
FIG. 5 is a flowchart illustrating an example of a control information transmission method of a base station supporting the dynamic format of the control channel transmission frame of FIG. 2.

FIG. 5 illustrates an example of a control information transmission method of a base station based on the dynamic format of the control channel transmission frame of FIG. 2.

Referring to FIG. 5, a base station determines whether to use an E-PDCCH in 510. When the base station determines not to use the E-PDCCH, the base station allocates RBs to data streams, in 520, and transmits control information using a PDCCH that is a control channel of a general system, in 530.

When the base station determines to use the E-PDCCH, the base station transmits a group terminal identifier, such as a group C-RNT, to one or more enhanced terminals, in 540. Transmission of the group terminal identifier has been previously described. The transmission of the group terminal identifier may be omitted in a subsequent period. The base station may allocate RBs to at least one data stream transmitted via an E-PDSCH, in 550. For example, the base station may allocate the control information associated with the RBs allocated to the at least one stream transmitted via the E-PDSCH, to the same resource region for the E-PDCCH. For example, the base station may perform one of spatial-multiplexing, beamforming, and beamforming spatial-multiplexing of the E-PDCCH. The base station may allocate common control information, such as DCI for the E-PDCCH, used for decoding the E-PDCCH. This process has been described with reference to FIG. 1.

When the allocation is completed, the base station transmits, using the PDCCH, the common control information used for decoding the E-PDCCH using the PDCCH, in 560. The base station transmits, using the E-PDCCH, the control information, such as DCI for an E-PDSCH, which is one of spatial-multiplexed, beamforming-processed, and beamforming-based spatial-multiplexed, in 570.

Accordingly, the base station may simultaneously support the general terminal and the enhanced terminal, using the transmission frame of FIG. 2, and may transmit the control information by selecting a control channel used for transmitting the control information based on whether the E-PDCCH is to be used.

FIG. 6 illustrates an example of a semi-static format of a control channel transmission frame to support an enhanced terminal.

Referring to FIG. 6, a base station may transmit an E-PDCCH 640 using a semi-statically allocated resource. For example, the semi-statically allocated resource may vary according to a predetermined resource or information transmitted based on a super frame unit. The base station may transmit common control information used for decoding the E-PDCCH 640 without using a PDCCH 620 or a PCFICH 610. Information corresponding to the common control information may be transmitted, for example, via a separate BCH or a predetermined channel of an upper layer. Therefore, the enhanced terminal may not be able to decode the PCFICH 610 or the PDCCH 620 which are the control channels of the general system.

In some embodiments, the length of the PDCCH 620 may be different for each frame. Accordingly, when a transmission location from which the E-PDCCH 640 is transmitted, is arranged in a front part of a frame, the E-PDCCH 640 may overlap with the PDCCH 620. For example, a location after a maximum symbol length occupied by the PDCCH 620 may be determined as the transmission location of the E-PDCCH 640. For example, a symbol after a fifth symbol may be determined as the transmission location of the E-PDCCH 640, based on the 3GPP LTE standard. As another example, a symbol after a symbol allocated to the E-PDCCH may transmit E-PDSCH 650.

The control information associated with the general terminal may be transmitted via the PDCCH 620, and data of the general terminal may be allocated to a region of the PDSCH 630.

Accordingly, an enhanced terminal may also decode a PDCCH, such as a control channel of a 3GPP LTE system, when the transmission frame in the example of FIG. 2 is used. However, when the transmission frame in the example of FIG. 6 is used the enhanced terminal may transmit the common control information without using the PDCCH 620, and thus, the enhanced terminal may not be able to decode the PDCCH 620.

Figure 7:
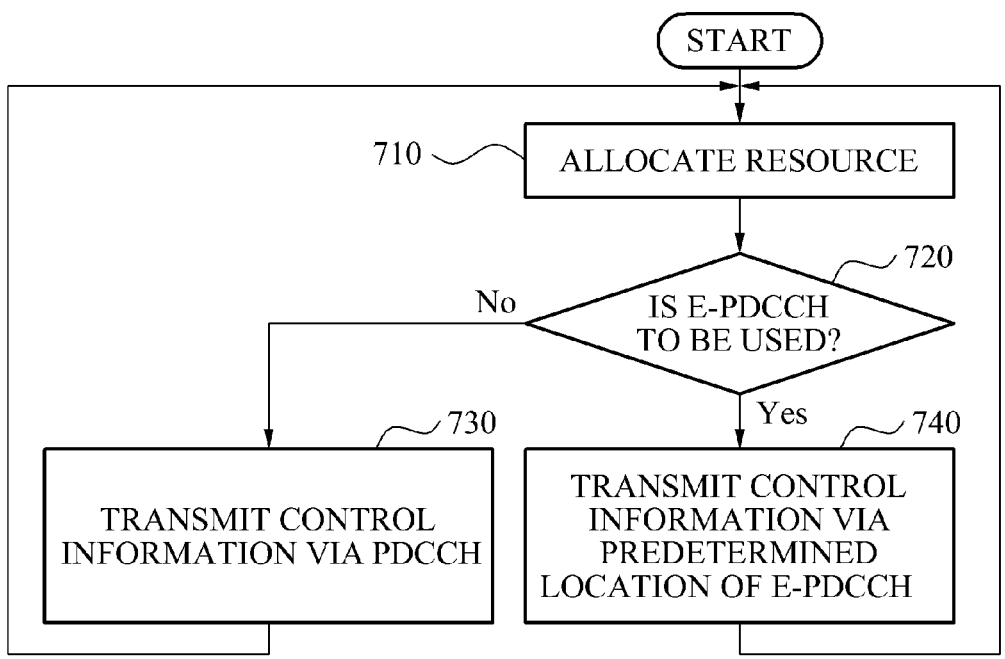
FIG. 7 is a flowchart illustrating an example of a control information transmission method of a base station supporting the semi-static format of the control channel transmission frame of FIG. 6.

FIG. 7 illustrates an example of a control information transmission method of a base station based on the semi-static format of the control channel transmission frame of FIG. 6.

Referring to FIG. 7, a base station allocates RBs to data streams, in 710. An example of allocating RBs is described with reference to FIG. 1. The base station determines whether to use a control channel of an enhanced system such as an E-PDCCH, in 720.

When the base station determines to not use the E-PDCCH, the base station transmits control information via a control channel of a general system such as a PDCCH, in 730.

When the base station determines to use the E-PDCCH, the base station transmits the control information via an E-PDCCH existing in a predetermined location, in 740. An example of transmitting the E-PDCCH using a semi-statically allocated resource is described with reference to FIG. 6.

Accordingly, when the transmission frame of FIG. 6 is used, the base station may simultaneously support a general terminal and an enhanced terminal based on the method of FIG. 7, and may transmit the control information by selecting a control channel to transmit the control information based on whether the E-PDCCH is to be used. While using the E-PDCCH, the base station may utilize a semi-statically allocated resource, and thus, the base station may not be able to decode the PDCCH.

Methods for Improving a Transmission Efficiency of an E-PDCCH

Three examples for improving the transmission efficiency of the E-PDCCH are provided.

In a first example, a base station may perform one of spatial-multiplexing, beamforming, and beamforming-based spatial-multiplexing with respect to an E-PDCCH of the same physical resource. The base station may transmit, to a single terminal or a plurality of terminals, the E-PDCCH that is one of spatial-multiplexed, beamforming-processed, and beamforming-based spatial-multiplexed. Accordingly, a transmission efficiency of control information may be improved. This method is described with reference to FIG. 1.

A second example may limit a resource occupied by the EPDCCH and an E-PDSCH and transmit corresponding information to a terminal.

For example, bitmap information of RBs used for transmitting the E-PDCCH and the E-PDSCH may be information associated with a set of RBs that the E-PDCCH and the E-PDSCH may occupy from among all of the RBs. In this example, when the transmission frame having a dynamic format of FIG. 2 is used, corresponding bitmap information of RBs may be included in the common control information, such as the DCI for the E-PDCCH, and may be transmitted via the PDCCH. As another example, when the transmission frame having a semi-static format is used, the corresponding bitmap information of RBs may be transmitted via a separate BCH or via a predetermined channel of an upper layer.

Overhead may decrease based on the second method, compared with the example of indicating a resource allocated to the E-PDCCH from among all of the RBs. For example, when total number of RBs is 100 and a bitmap is allocated for every fourth RB, a length of an RB assignment bitmap is 25 bits. However, when the number of RBs for the E-PDCCH and the E-PDSCH is limited to 40, the length of the RB assignment bitmap included in the DCI transmitted via the E-PDCCH may be shortened. For example, the length of the RB bitmap may be shortened to 10 bits.

A third example may match a physical resource occupied by the E-PDCCH to a physical resource occupied by an enhanced data transmission channel, such as the E-PDSCH, corresponding to the E-PDCCH. For example, the base station may allocate control information to overlap a resource region for the E-PDCCH to a region of RBs where the data streams are allocated.

When the control information is transmitted via the PDCCH, a mapping relation between a basic physical resource unit used for transmitting the PDCCH and the RBs where the data streams are allocated may not exist. Although information associated with RBs used for transmitting the PDSCH may be recognized, information associated with a CCE used for allocating a corresponding PDCCH may not be recognized. In another example, although information associated with a CCE used for transmitting the PDCCH is recognized, information associated with RBs used for transmitting the PDSCH may not be recognized. However, a control information transmission method of the enhanced system may match a range of a resource region occupied by the E-PDCCH to a range of RBs occupied by the E-PDSCH, as illustrated in FIG. 2. As described above, a terminal may recognize a physical resource occupied by the E-PDCCH and the E-PDSCH based on information associated with a limitation of RBs included in the common control information. In this example, the control information may be the DCI for the E-PDCCH, information transmitted via a BCH, or a predetermined channel of an upper layer. An example thereof is described with reference to FIG. 8.

Figure 8:
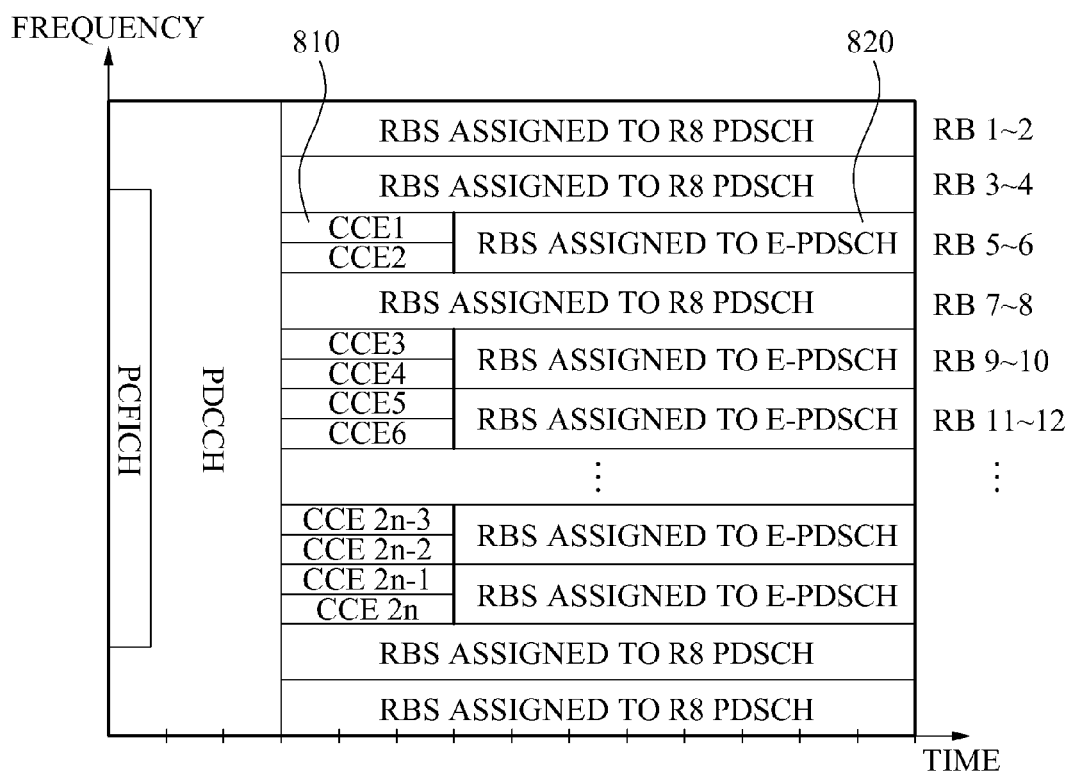
FIG. 8 is a diagram illustrating an example of a format of a transmission frame where a control channel element (CCE) used for transmitting an E-PDCCH and an RB used for transmitting an E-PDSCH are mapped.

FIG. 8 illustrates an example of a format of a transmission frame where a CCE used for transmitting E-PDCCH and an RB used for transmitting E-PDSCH are mapped.

Referring to FIG. 8, mapping between a CCE 810 used for transmitting an E-PDCCH and an RB 820 used for transmitting the E-PDSCH may be determined based on a predetermined rule, for example, one RB per CCE. For example, when information associated with limitation of RBs used for transmitting the E-PDSCH is transmitted via common control information associated with CCEs used for decoding the E-PDCCH, and information associated with arrangement of the CCEs may be obtained.

For example, the common control information may include bitmap information of RBs used in the E-PDCCH and the E-PDSCH, and each bitmap may indicate the number of RBs that are allocated. When the enhanced terminal decodes the bitmap information of RBs, the enhanced terminal may recognize that RBs used for transmitting the E-PDSCH are sequentially mapped to CCEs, and the number of RBs used for transmitting the E-PDSCH and the number of symbols used for transmitting the E-PDCCH, are the same. The enhanced terminal may also recognize information associated with a resource region that transmits E-PDCCH, without additional information associated with a number of CCEs.

Method for Decreasing a Decoding Complexity with Respect to a Control Channel of a Terminal in an Enhanced System Selectively Decoding a PDCCH or an E-PDCCH Using an Indicator When common control information used for decoding the E-PDCCH is transmitted using the transmission frame of FIG. 2 or using the PDCCH based on the control information transmission method of FIG. 5, RB assignment information with respect to an enhanced terminal may be transmitted via the PDCCH or the E-PDCCH. In this example, the enhanced terminal may attempt to decode both the PDCCH and the E-PDCCH based on both probabilities, and thus, a decoding complexity may increase.

Accordingly, methods for decreasing the decoding complexity may be used. As an example, when the enhanced terminal initially receives a resource allocated from a base station, it may be predetermined that the enhanced terminal receives control information from a predetermined control channel from among the PDCCH and the E-PDCCH, for example, from an initially predetermined control channel. When the indicator associated with a location about where control information is to be allocated during and after a subsequent resource allocation period, is transmitted, decoding may be performed with respect to one of the PDCCH and the E-PDCCH. Accordingly, the decoding complexity may decrease.

For example, the indicator may indicate a channel to be used during the subsequent allocation period for transmitting resource allocation information such as control information. For example, the indicator may be included in a control message, such as DCI for the E-PDSCH which is transmitted via the E-PDCCH for the enhanced terminal. As another example, the indicator may be included in a control message, such as DCI for the PDSCH which is transmitted via the PDCCH for the enhanced terminal. In these examples, the decoding complexity with respect to the control channel of the enhanced terminal may decrease. For example, when the enhanced terminal recognizes that the resource allocation information is to be transmitted via the PDCCH, the enhanced terminal may not attempt decoding of the DCI for E-PDCCH and the E-PDCCH, and when the enhanced terminal recognizes that the resource allocation information is to be transmitted via the E-PDCCH, the enhanced terminal may not attempt decoding of DCI that is transmitted to a corresponding terminal, from among the PDCCH.

For example, the indicator may directly indicate a channel, such as indicating the PDCCH as '0' or indicating the E-PDCCH as '1'. As another example, the indicator may indicate whether a control channel used in a subsequent resource allocation period is to be changed as compared with a control channel used in a current resource allocation period. For example, a state of being changed may be indicated as '1' and a state of not being changed is indicated as '0'.

Channels of the general system, such as the PDCCH and a PDSCH, and channels of the enhanced system, such as the E-PDCCH and an E-PDSCH, may be dynamically utilized. For example, when a desired capacity of a data channel is high and a desired capacity of a control channel is low, the E-PDSCH may be used as the data channel and the PDCCH may be used as a control channel. Accordingly, a wide region for the data channel may be utilized. In this example, the indicator may indicate a channel to be used, such as the PDCCH or the E-PDCCH, for an asymmetric loading factor of the data channel and the control channel. Accordingly, the enhanced terminal may dynamically handle data transmission.

Figure 9A:
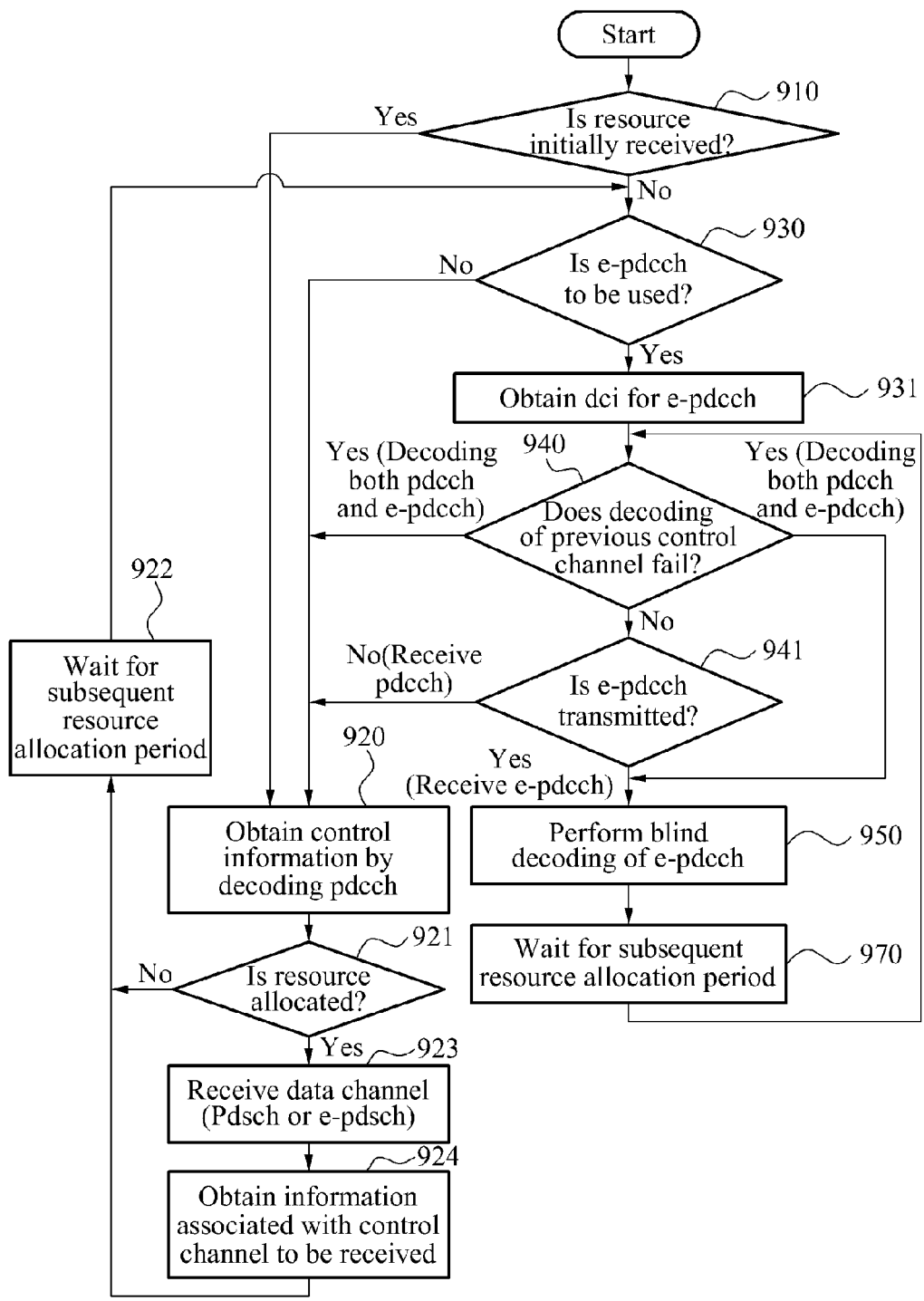
FIG. 9A is a flowchart illustrating an example of a control information reception method of an enhanced terminal.

FIG. 9A illustrates an example of a control information reception method of an enhanced terminal.

Referring to FIG. 9A, the enhanced terminal determines whether the enhanced terminal initially receives a resource allocated from a base station, in 910.

When it is an initial time for the enhanced terminal to receive the resource allocated from the base station, the enhanced terminal may receive control information via a predetermined channel from among a PDCCH and an E-PDCCH. Referring to FIG. 9A, the predetermined control channel is the PDCCH. In 920, the enhanced terminal decodes the PDCCH to obtain control information. In 921, the enhanced terminal determines whether the resources are allocated based on the decoded resource allocation information. Based on whether the resources are determined to be allocated in 921, the enhanced terminal waits for a subsequent resource allocation period, in 922, or the enhanced terminal receives data via a data channel, such as a PDSCH or an E-PDSCH, in 923. The enhanced terminal obtains information associated with a control channel that may transmit control information during the subsequent resource allocation period, in 924.

When it is not the initial time for the enhanced terminal to receive the resource allocated, the enhanced terminal determines whether to use the E-PDCCH for transmitting the control information, in 930. For example, the enhanced terminal may extract a previous indicator included in control information received during a previous resource allocation period and may determine whether to use the E-PDCCH based on the indicator. When the determination determines not to use the E-PDCCH, the enhanced terminal decodes the PDCCH in 920, and subsequently 921 is performed.

When the determination of 930 determines to not use the E-PDCCH, the enhanced terminal obtains common control information used for decoding the E-PDCCH, in 931.

For example, the common control information may be obtained by the enhanced terminal by decoding the common information based on a group terminal identifier, such as a group C-RNTI, which may be commonly allocated to all terminals in an enhanced system. In this example, when the transmission frame having a dynamic format of FIG. 2 is used, the common control information may be transmitted via the PDCCH. Accordingly, the enhanced terminal may obtain the common control information by decoding the PDCCH. The common control information may include the group terminal identifier, such as the Group C-RNTI, as described above.

For example, when the transmission frame having a semi-static format of FIG. 6 is used, the common control information may be received via the predetermined channel. The predetermined channel may be a separate BCH or may be other channels. Therefore, the enhanced terminal may obtain the common control information via the predetermined channel.

Subsequently, the enhanced terminal determines whether decoding of a control channel during the previous resource allocation period fails, in 940.

When the decoding of the control channel during the previous resource allocation period fails, the enhanced terminal may not be able to determine whether the control information is to be transmitted via the PDCCH or via the E-PDCCH, during the subsequent resource allocation period. To overcome this problem, the enhanced terminal that fails in decoding the control channel may decode both the PDCCH and the E-PDCCH for a predetermined number of times. When allocated control information does not exist even after performing the multiple decoding attempts, the enhanced terminal may attempt decoding of only an initially predetermined control channel. This may be referred to as a fall back mode of a terminal that fails in decoding. When the base station fails to receive feedback, such as an acknowledgment (ACK) or negative acknowledgment (NACK), the ACK and NACK being associated with a result of the decoding even when the base station allocates a resource, at least a predetermined number of times, the base station may transmit the initially predetermined control channel, such as the PDCCH or the E-PDCCH a subsequent time where the base station allocates the resource.

Whether the E-PDCCH is transmitted is determined in 941. When the PDCCH is received, the enhanced terminal proceeds with operation 920 to decode the PDCCH. When the E-PDCCH is received, the enhanced terminal decodes the E-PDCCH based on a blind decoding scheme in 950. The enhanced terminal waits for the subsequent resource allocation period, in 970.

Method of Decreasing Blind Decoding Complexity with Respect to E-PDCCH

Figure 9B:
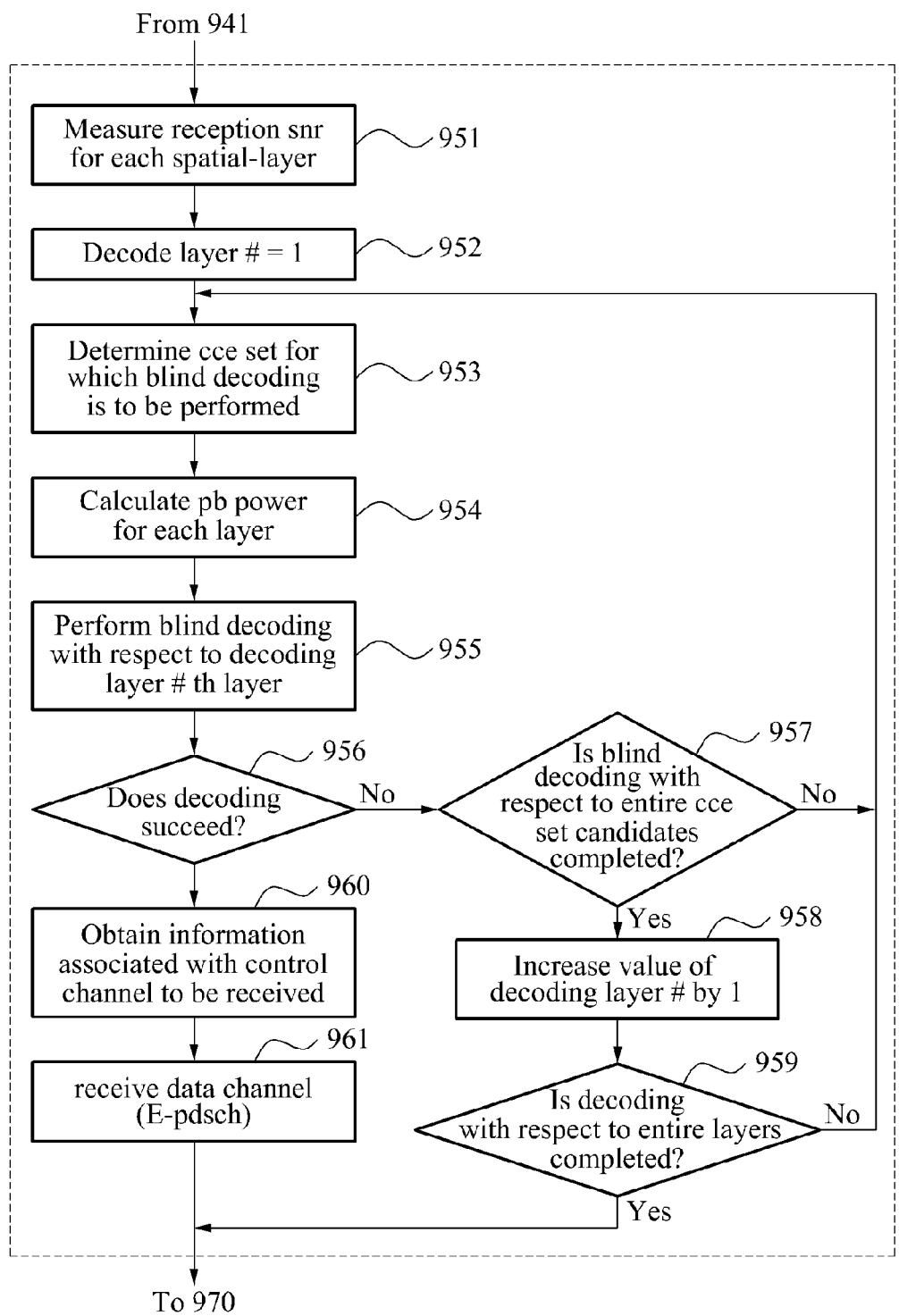
FIG. 9B is a flowchart illustrating a process of decoding an E-PDCCH based on a blind decoding scheme.

FIG. 9B illustrates a process of decoding an E-PDCCH based on a blind decoding scheme. Referring to FIG. 9B, operation 950 in FIG. 9A is further described.

Referring to FIG. 9B, an enhanced terminal may be allocated to the same resource region, for example, the resource region being for the E-PDCCH. The enhanced terminal may receive control information that is one of spatial-multiplexed, beamforming performed, and beamforming-based spatial-multiplexed. The control information is information associated with RBs allocated to at least one data stream transmitted via an E-PDSCH. When the enhanced terminal decodes a plurality of candidates associated with control information, based on the blind decoding scheme, the enhanced terminal may decrease a decoding complexity based on following methods.

When a plurality of E-PDCCHs are transmitted after being one of spatial-multiplexed, beamforming-processed, and beamforming-based spatial-multiplexed, based on the same time frequency resource, each of the plurality of E-PDCCHs may use a different dedicated RS, such as DM-RS. The enhanced terminal may not recognize a port to be allocated to a target enhanced terminal, from among a plurality of streams that is one of spatial-multiplexed, beamforming-processed, and beamforming-based spatial-multiplexed. Therefore, the enhanced terminal may perform blind decoding with respect to all ports. For example, a number of candidates that are to be targets of the blind decoding may increase in proportion to a number of layers. As a result, the control channel decoding complexity of the enhanced terminal may increase. For example, when four streams where different control information is encoded are spatial-multiplexed and transmitted, the enhanced terminal may not recognize a layer to be allocated to the corresponding terminal, and thus, the enhanced terminal may attempt decoding with respect to all layers.

Methods to decrease the blind decoding complexity are provided hereinafter. When a scheduling is performed, the E-PDCCH may have a high possibility of being transmitted via a spatial-layer that has a superior signal to noise ratio (SNR) in a receiving terminal. Therefore, in 951 the enhanced terminal estimates a reception SNR based on RSs for each layer before performing the blind decoding. For example, the enhanced terminal may be decoded in an order of highest SNR to lowest SNR. The enhanced terminal may start decoding of a first layer, in 952. The enhanced terminal determines an entire CCE candidate set, in 953, calculates a PB power for each layer, in 954, and performs blind decoding with respect to the entire CCE candidate set in the order of highest SNR to lowest SNR, in 955. In 956, whether the blind decoding is successful for that respective layer is determined.

If not successful, the enhanced terminal performs blind decoding with respect to the entire CCE candidate set, in 957. When the blind decoding fails, the enhanced terminal performs blind decoding with respect to a layer having a second highest SNR, for example a subsequent layer, in 958. In this manner, a sequence of the decoding may be determined, and subsequent layers are decoded until decoding of all the layers is completed, in 959. For example, an SNR of a spatial-layer allocated to the corresponding enhanced terminal may be high, and thus, the decoding complexity may dramatically decrease when decoding is performed based on a priority.

When decoding with respect to a predetermined layer succeeds in 956, the enhanced terminal may obtain, through an indicator included in control information, information associated with a control channel where the control information is to be transmitted during a subsequent resource allocation period, in 960. Data is received via the E-PDSCH, in 961.

The enhanced terminal may perform blind decoding until a predetermined number of control information are successfully decoded. For example, the enhanced terminal may perform decoding with respect to layers in an order of highest SNR to lowest SNR, until the same number of control information as a number of control information to be allocated to the enhanced terminal is successfully decoded, and when the predetermined number of control information is successfully decoded, the enhanced terminal may stop decoding.

Figure 10:
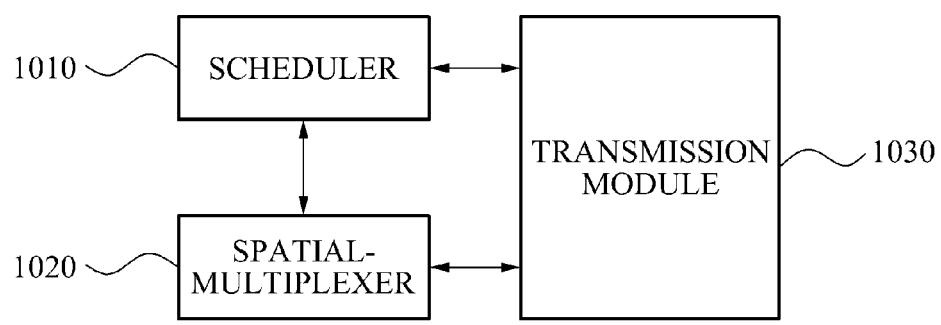
FIG. 10 is a diagram illustrating an example of a transmitter that simultaneously supports a general terminal and an enhanced terminal.

FIG. 10 illustrates an example of a transmitter that simultaneously supports a general terminal and an enhanced terminal.

Referring to FIG. 10, the transmitter that simultaneously supports a general terminal and an enhanced terminal includes a scheduler 1010, a spatial-multiplexer 1020, and a transmission module 1030.

The scheduler 1010 may allocate RBs to at least one data stream transmitted via an E-PDSCH, may generate control information for each of the RBs, and may allocate the control information for each of the RBs to the same resource region. For example, the resource region may be for an E-PDCCH.

The spatial-multiplexer 1020 may perform, based on the same resource region, one of beamforming, spatial-multiplexing, and beamforming-based spatial-multiplexing with respect to the control information for each of the RBs.

The transmission module 1030 may transmit, to each terminal, the control information that is one of beamforming-processed, spatial-multiplexed, and beamforming-based spatial-multiplexed.

Figure 11:
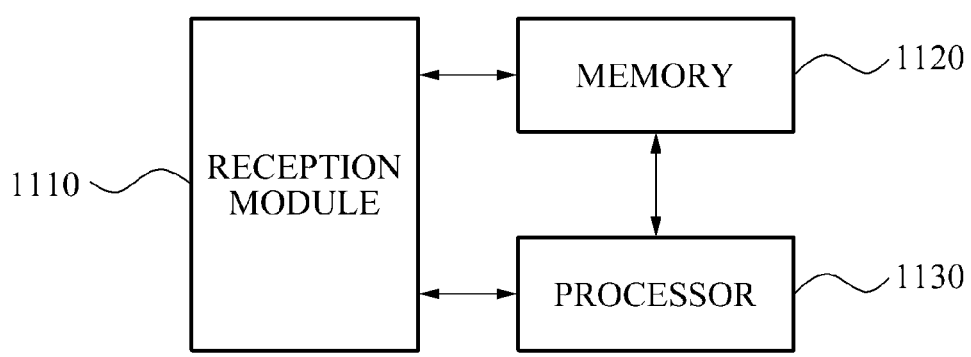
FIG. 11 is a diagram illustrating an example of an enhanced terminal.

FIG. 11 illustrates an example of an enhanced terminal.

Referring to FIG. 11, the enhanced terminal includes a reception module 1110, a memory 1120, and a processor 1130.

The reception module 1110 may receive control information and data streams from a base station.

The memory 1120 may store a previous indicator included in control information received during a previous resource allocation period.

The processor 1130 determines, based on the previous indicator, a channel used for transmitting target control information, for example, from among an E-PDCCH and a PDCCH, and performs decoding with respect to the target control information based on the determination.

The transmitter and the receiver have been described with reference to FIGS. 10 and 11. It should be understood that the examples described with reference to FIGS. 1 through 9 may be applicable to the transmitter and the receiver.

As a non-exhaustive illustration only, the terminal device, that is, the transmitter and/or the receiver, described herein may refer to mobile devices such as a cellular phone, a personal digital assistant (PDA), a digital camera, a portable game console, an MP3 player, a portable/personal multimedia player (PMP), a handheld e-book, a portable lab-top personal computer (PC), a global positioning system (GPS) navigation, and devices such as a desktop PC, a high definition television (HDTV), an optical disc player, a setup box, and the like, capable of wireless communication or network communication consistent with that disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer.

It should be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

The above-described methods, processes, functions, and/or software may be recorded in a computer-readable storage media including program instructions to implement various operations embodied by a computer. The media may also include, alone or in combination with the program instructions, data files, data structures, and the like. Examples of computer-readable storage media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa. In addition, the computer-readable storage medium may be distributed among computer systems connected through a network and computer-readable codes or program instructions may be stored and executed in a to decentralized manner.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A transmission method, comprising:
    transmitting, to terminals supported by an enhanced system, a group terminal identifier of the terminals;
    allocating resource blocks (RBs) to at least one data stream transmitted via an enhanced-physical downlink shared channel (E-PDSCH);
    generating control information for each of the RBs;
    allocating the control information for each of the RBs to a resource region for an enhanced-physical downlink control channel (E-PDCCH); and
    performing beamforming, or spatial-multiplexing, or beamforming-based spatial-multiplexing, of the control information for each of the RBs, based on the resource region,
    wherein a type 1 terminal succeeds in decoding the control information received via the E-PDCCH, and a type 2 terminal does not decode, or fails in decoding, the control information received via the E-PDCCH, and is supported by a different type of system than the type 1 terminal.

2. The transmission method of claim 1, further comprising:
    generating an indicator indicating whether the E-PDCCH is used in a subsequent resource allocation period,
    wherein the control information for each of the RBs comprises the indicator.

3. The transmission method of claim 1, wherein the resource region is used to transmit the control information for each of the RBs, and is a portion of a physical resource used by the E-PDSCH.

4. The transmission method of claim 1, further comprising:
    generating common control information used to decode the control information for each of the RBs; and transmitting the common control information via a physical downlink control channel (PDCCH).

5. The transmission method of claim 4, wherein the common control information comprises information associated with a range of the resource region to which the control information for each of the RBs is allocated, or information associated with a range of the RBs to which the at least one data stream is allocated, or the group terminal identifier of the terminals where decoding of the E-PDCCH is to be performed, or information associated with a location and a pilot pattern for demodulation, or information associated with a power offset, or information associated with a transport format, or any combination thereof.

6. The transmission method of claim 4, wherein:
the allocating of the RBs comprises allocating a portion of all RBs to the at least one data stream;
the allocating of the control information comprises allocating the control information for each of the RBs to a portion of an entire resource region for the E-PDCCH; and
the common control information comprises information associated with the portion of all the RBs, and information associated with the portion of the entire resource region.

7. The transmission method of claim 4, further comprising:
allocating the common control information to a predetermined resource region for the PDCCH,
wherein both the type 1 terminal and the type 2 terminal successfully decode information received via the PDCCH.

8. The transmission method of claim 7, wherein:
the type 1 terminal is supported by the enhanced system; and
the type 2 terminal is supported by a general system.

9. The transmission method of claim 1, further comprising:
generating common control information used to decode the control information for each of the RBs; and
transmitting the common control information via a predetermined broadcast channel.

10. The transmission method of claim 9, wherein the common control information comprises information associated with a range of the resource region to which the control information for each of the RBs is allocated, or information associated with a range of the RBs to which the at least one data stream is allocated, or the group terminal identifier of the terminals where decoding of the E-PDCCH is to be performed, or information associated with a location and a pilot pattern for demodulation, or information associated with a power offset, or information associated with a transport format, or any combination thereof.

11. The transmission method of claim 9, wherein:
the allocating of the RBs comprises allocating a portion of all RBs to the at least one data stream;
the allocating of the control information comprises allocating the control information for each of the RBs to a portion of an entire resource region for the E-PDCCH; and the common control information comprises information associated with the portion of all the RBs, and information associated with the portion of the entire resource region.

12. The transmission method of claim 1, wherein the control information comprises information associated with a range of the RBs to which the at least one data stream is allocated, or information associated with a number of the at least one data stream, or a terminal identifier of a terminal to which the control information is allocated, or location information and a pilot pattern for demodulation, or information associated with a power offset, or information associated with a co-scheduled terminal, or H-ARQ information, or information associated with a modulation and coding scheme, or any combination thereof.

13. The transmission method of claim 1, wherein the resource region overlaps a region of the RBs to which the at least one data stream is allocated.

14. The transmission method of claim 1, wherein:
the type 1 terminal is supported by the enhanced system; and
the type 2 terminal is supported by a general system.

15. A transmitter, comprising:
a transmission module configured to transmit, to terminals supported by an enhanced system, a group terminal identifier of the terminals;
a scheduler configured to
allocate resource blocks (RBs) to at least one data stream transmitted via an enhanced-physical downlink shared channel (E-PDSCH),
generate control information for each of the RBs, and
allocate the control information for each of the RBs to a resource region for an enhanced-physical downlink control channel (E-PDCCH); and
a spatial-multiplexer configured to perform beamforming, or spatial-multiplexing, or beamforming-based spatial-multiplexing, of the control information for each of the RBs, based on the resource region,
wherein a type 1 terminal succeeds in decoding the control information received via the E-PDCCH, and a type 2 terminal does not decode, or fails in decoding, the control information received via the E-PDCCH, and is supported by a different type of system than the type 1 terminal.

16. The transmission method of claim 1, wherein a portion of the RBs allocated to the at least one data stream transmitted via the E-PDSCH is not used.

17. The transmission method of claim 1, wherein a portion of the resource region for the E-PDCCH is not used.

18. The transmission method of claim 4, wherein the common control information comprises the group terminal identifier of the terminals.

19. The transmission method of claim 4, wherein the terminals receive the group terminal identifier and the common control information, and decode the common control information based on the received group terminal identifier.

* * * * *